(No Model.)

C. HERMANN.
REVERSING GEAR.

No. 454,434. Patented June 16, 1891.

WITNESSES:
Chas. H. Luther Jr.
M. F. Bligh.

INVENTOR:
Christian Hermann
by Joseph A. Miller & Co.
Attys.

UNITED STATES PATENT OFFICE.

CHRISTIAN HERMANN, OF BRISTOL, RHODE ISLAND, ASSIGNOR OF ONE-HALF TO CHARLES W. TIRRELL, OF SAME PLACE.

REVERSING-GEAR.

SPECIFICATION forming part of Letters Patent No. 454,434, dated June 16, 1891.

Application filed October 8, 1890. Serial No. 367,404. (No model.)

*To all whom it may concern:*

Be it known that I, CHRISTIAN HERMANN, of Bristol, in the county of Bristol and State of Rhode Island, have invented a new and useful Improvement in Reversing-Gears; and I hereby declare that the following is a full, clear, and exact description of the same, reference being had to the accompanying drawings, forming part of this specification.
This invention has reference to an improved device for reversing the motion of a machine, and is particularly applicable to planing or other machines in which it is desirable that the speed of the machine be quicker when moving in one direction than when moving in the opposite direction.

The invention consists in the peculiar construction and combination, with a loose pulley of a driving or counter shaft, of two clutches, one of which is driven directly by the shaft and the other through gears, as will be more fully set forth hereinafter.

In planing, grinding, screw-cutting, and other machines the work is done while either the tool or the article operated upon is moving in one direction, and during the return of the work or tool no work is done. The power required, therefore, when moving in one direction is greater than the power required while moving in the opposite direction.

The object of this invention is to so construct a counter or driving shaft that a machine driven from such shaft will be driven in one direction at a greater, and in the opposite direction at a lesser, speed.

Figure 1:
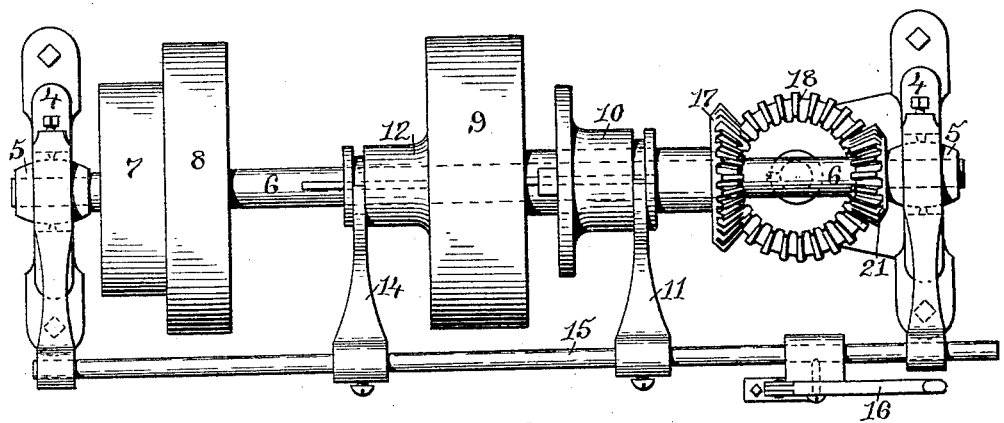
Figure 2:
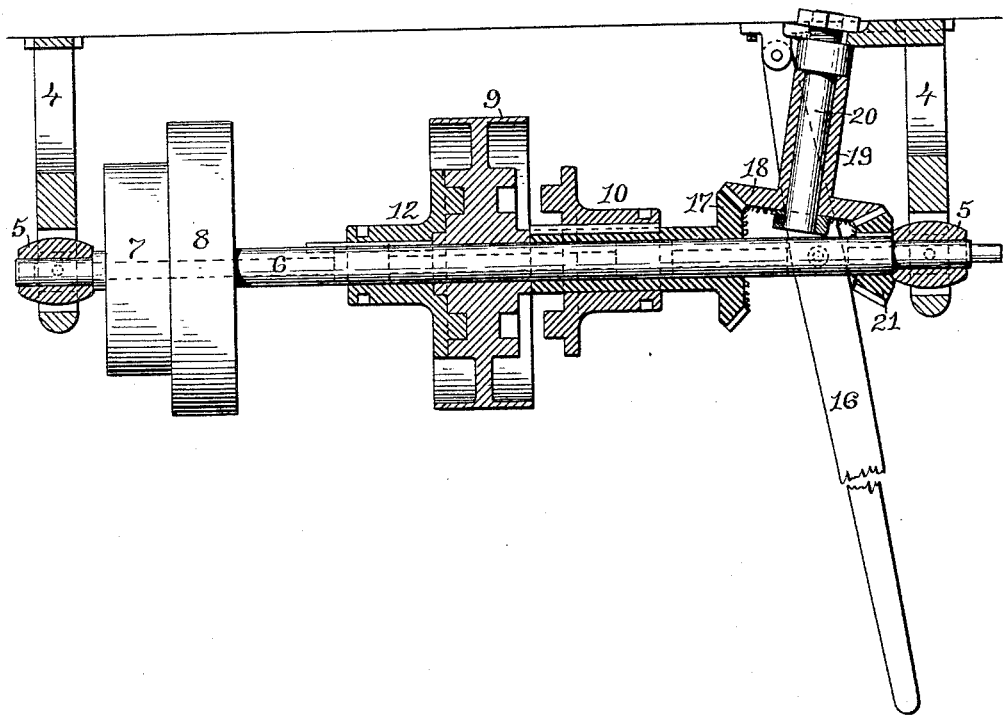

Figure 1 is a horizontal view of a shaft provided with a loose pulley and my improved reversing-gear. Fig. 2 is a side view of the same, shown partly in section.
Similar numbers of reference indicate corresponding parts in both the figures.

In the drawings, the numbers 4 indicate the hangers; 5, the bearing-boxes; 6, the shaft journaled in the bearing-boxes supported by the hangers. The shaft 6 may be a main or line shaft; but usually it is a counter-shaft placed intermediate between the line or driving shaft and the machine to be driven. The drawings represent the same as a counter-shaft driven from the main or line shaft through either one of the pulleys 7 or 8. The pulley 9 is a loose pulley and is connected with the machine by means of a belt or band. This loose pulley is provided on each side with a clutch. These clutches may be of any of the many forms of friction or positive locking-clutches.

The number 10 indicates a clutch secured to the shaft 6 and turning with the same, operated by the arm 11 to connect the clutch with the loose pulley 9, and thereby turn the pulley with the shaft 6 and disconnect the same by moving the arm 11 toward or from the clutch.

12 is a clutch placed on the side of the loose pulley opposite the side on which the clutch 10 is placed. The clutch 12 is secured to the sleeve 13, which surrounds the shaft 6 and turns loosely on the same. The arm 11, operating the clutch 10, and the arm 14, operating the clutch 12, are connected with the shipper-rod 15, and are placed a sufficient distance apart to permit the sliding of one arm, so as to disengage the clutch operated by this arm before the other clutch engages with the loose pulley 9, so that both the clutches may be disengaged from the pulley 9 and the same turn independent of the shaft 6 or the sleeve 13, and the machine connected with the pulley 9 by a belt or band be stopped, while the shaft 6 continues to revolve. The shipper-lever 16 is connected with the shipper-rod 15 in the usual manner.

To the end of the sleeve 13 farthest from the pulley 9 the bevel-gear 17 is secured or made in one piece with the sleeve 13. The beveled gear 17 meshes with the intermediate or idle gear 18, provided with the sleeve 19 and turning on the stud 20, and this idle-gear 18 meshes with the beveled pinion 21, secured to and turning with the shaft 6. Considering the proportions of the beveled gear to be such that the idle-gear 18 has twice the number of teeth on the pinion 21, then the idle-gear will turn once to two revolutions of the shaft 6 and pinion 21. If now the beveled gear 17 has the same number of teeth on the idle-gear 18, then the sleeve 13 will make one revolution to two revolutions of the shaft 6 and will turn in the direction opposite to the direction of the shaft 6.

To enable others skilled in the art to use my invention, I will describe the operation of the same more fully.

When the shaft 6, forming the line-shaft, driven by a prime motor or the counter-shaft connected by a belt or band extending from a pulley on the line-shaft to either of the pulleys 7 or 8, is turning at a fixed speed constantly in the same direction and the loose pulley 9 is connected by means of the clutch 10 with the shaft 6, then motion is imparted to a machine connected by a belt or band with the pulley 9 in the same direction in which the shaft 6 moves. When now the machine is to be stopped, the shipper-rod is moved sufficiently to move the arm laterally to engage or release the clutch 10 from the pulley 9, and simultaneously therewith move the arm 14 and clutch 12 toward and nearly in engagement with the loose pulley 9, which is, when all parts are in the position described, held against rotation by the belt or band connecting it with the machine the shaft 6 turns in the loose pulley and the machine is stopped. By moving now the shipper-rod still farther in the same direction toward the left-hand side of the drawings the arm 14 will move the clutch 12, connect the same with the pulley 9, and as the clutch 12 is secured to and turns with the sleeve 13, the pulley 9 will turn with the sleeve 13, which sleeve is turned by means of the pinion 21, the idle-gear 18, and beveled gear 17 in the direction opposite or against the direction of the shaft 6 and at a reduced speed, and the machine connected with the pulley 9 will be turned in the direction opposite from the direction in which it is driven when the pulley 9 is connected with the shaft 6 by the clutch 10 and at reduced speed. If the machine to be driven from the loose pulley 9 is a planing, grinding, or other similar machine in which tool or the work is reciprocated, the loose pulley 9 is connected by shifting the shipper and moving the arm 14 and the clutch 12, so as to connect the same with the pulley 9 and impart motion to the machine from the shaft 6 through the pinion 21, idle-gear 18 beveled, gear 17, sleeve 13, and pulley 9 at reduced speed in the direction in which the tool performs its work, and the greater power is required to reverse the motion by shifting the shipper in the opposite direction, disengaging the clutch 12 from the pulley 9, and moving the arm 14 and the clutch 10 to connect the pulley 9 with the shaft 6, and thus turn the machine in the reversed direction at greater speed, while either the work or the tool is moved to the first position. By this arrangement the wear on the belts caused by shipping the same from one pulley to the other pulleys is avoided, the manipulation of reversing is simplified, and time is saved.

Having thus described my invention, I claim as new and desire to secure by Letters Patent—

1. A reversing-gear consisting of a pulley loose on the driving-shaft, a clutch adapted to engage with the loose pulley on one side and secured to the driving-shaft, a clutch adapted to engage with the opposite side of the loose pulley and secured to a sleeve surrounding the driving-shaft, said sleeve being provided with a beveled gear meshing with an idle-gear, a beveled pinion secured to the driving-shaft and meshing with the idle-gear, and a shipper device constructed to connect the clutches with the loose pulley and disconnect the same, as described.

2. The combination, with the shaft 6, loose pulley 9, the shipping-lever 16, shipper-rod 15, and the arms 11 and 14, of the clutches 10 and 12, the sleeve 13, provided with the beveled gear 17, the idle-gear 18, the pinion 21, secured to the shaft 6, constructed to stop, start, and reverse the motion of the loose pulley and drive a machine connected therewith in opposite directions at different speeds, as described.

CHRISTIAN HERMANN.

Witnesses:
C. B. BRIGHAM,
JAMES H. CORTHELL.